(12) United States Patent
Huang

(10) Patent No.: US 10,598,991 B2
(45) Date of Patent: Mar. 24, 2020

(54) DISPLAY SUBSTRATE, DISPLAY PANEL CUTTING METHOD AND DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventor: Shiqiang Huang, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

(*) Notice: Subject to any disclaimer, the term of this patent is extended or adjusted under 35 U.S.C. 154(b) by 0 days.

(21) Appl. No.: 15/508,305

(22) PCT Filed: Aug. 9, 2016

(86) PCT No.: PCT/CN2016/094145
§ 371 (c)(1),
(2) Date: Mar. 2, 2017

(87) PCT Pub. No.: WO2017/076093
PCT Pub. Date: May 11, 2017

(65) Prior Publication Data
US 2018/0356658 A1    Dec. 13, 2018

(30) Foreign Application Priority Data

Nov. 5, 2015 (CN) .......................... 2015 1 0747075

(51) Int. Cl.
G02F 1/1339 (2006.01)
G02F 1/1341 (2006.01)
G02F 1/1333 (2006.01)

(52) U.S. Cl.
CPC .......... G02F 1/1339 (2013.01); G02F 1/1341 (2013.01); G02F 1/133351 (2013.01);
(Continued)

(58) Field of Classification Search
CPC .............. G02F 1/13394; G02F 1/1339; G02F 1/133351; H01L 27/124; H01L 27/1259
See application file for complete search history.

(56) References Cited

U.S. PATENT DOCUMENTS 6,010,384 A * 1/2000 Nishino ................ C03B 33/076
349/187
2008/0198287 A1 * 8/2008 Kim .................... G02F 1/13454
349/42
(Continued)

FOREIGN PATENT DOCUMENTS

CN   102200663 A   9/2011
CN   102540580 A   7/2012
(Continued)

OTHER PUBLICATIONS

First Office Action for Chinese Application No. 201510747075.0, dated Dec. 4, 2017, 8 Pages.
(Continued)

*Primary Examiner* — Hoan C Nguyen
(74) *Attorney, Agent, or Firm* — Brooks Kushman P.C.

(57) ABSTRACT

A display panel, a display panel cutting method, and a display device are provided. The display substrate includes at least two sub display regions and at least one blocking unit. Each of the at least one blocking unit includes two strip-like blocking patterns that are arranged at two sides of an adhesive cutting line on the display substrate respectively, and arranged in periphery regions of two adjacent sub display regions respectively.

18 Claims, 6 Drawing Sheets

(52) U.S. Cl.
CPC ............ *G02F 2001/133354* (2013.01); *G02F 2201/50* (2013.01); *G02F 2201/501* (2013.01); *G02F 2202/28* (2013.01)

(56) References Cited

U.S. PATENT DOCUMENTS

| | | | |
|---|---|---|---|
| 2010/0045921 A1* | 2/2010 | Wang | ................ G02F 1/133351 349/153 |
| 2011/0234967 A1 | 9/2011 | Kim | |
| 2012/0026449 A1 | 2/2012 | Yang et al. | |
| 2012/0133874 A1 | 5/2012 | Hoshina et al. | |
| 2016/0026019 A1* | 1/2016 | Choi | ................ G02F 1/133514 428/189 |
| 2016/0266435 A1 | 9/2016 | Xiao et al. | |
| 2016/0291375 A1 | 10/2016 | Meng et al. | |

FOREIGN PATENT DOCUMENTS

| | | |
|---|---|---|
| CN | 104216176 A | 12/2014 |
| CN | 104635385 A | 5/2015 |
| CN | 104698695 A | 6/2015 |

OTHER PUBLICATIONS

International Search Report and Written Opinion for Application No. PCT/CN2016/094145, dated Oct. 28, 2016, 12 Pages.

\* cited by examiner

DISPLAY SUBSTRATE, DISPLAY PANEL CUTTING METHOD AND DISPLAY DEVICE

CROSS-REFERENCE TO RELATED APPLICATIONS

This application is the U.S. national phase of PCT Application No. PCT/CN2016/094145 filed on Aug. 9, 2016, which claims priority to Chinese Patent Application No. 201510747075.0 filed on Nov. 5, 2015, the disclosures of which are incorporated in their entirety by reference herein.

TECHNICAL FIELD

The present disclosure relates to the technical field of displaying, in particular to a display substrate, a display panel cutting method, and a display device.

BACKGROUND

A display panel includes two display substrates, i.e. an array substrate and a color filter substrate. During a process of manufacturing the display panels, in consideration of productivity, it is firstly to produce two large display substrates each including multiple small sub display regions, and then the two large display substrates (i.e. a large array substrate and a large color filter substrate) are bonded together by sealant to form a raw display panel, and finally the raw display panel is cut into multiple sub display panels.

In related technology, datum points of an adhesive cutting line may be arranged on the display panel and configured for determining a position of the adhesive cutting line, the adhesive cutting line indicates a cutting position for two adjacent sub display regions, gate drivers on array (GOAs) of the two adjacent sub display regions are not arranged at the adhesive cutting line. When the sealant is applied on the display substrate, the position of the adhesive cutting line may be determined based on the datum points, and then two applying traces are arranged at both sides of the adhesive cutting line respectively, and are parallel with and of an equal distance to the adhesive cutting line. The applying traces represent projections of moving traces of sealant nozzles on the display panel upon the sealant nozzles applying the sealant. When ejected from the sealant nozzles, the sealant may spread to surroundings of the applying traces and cover the adhesive cutting line. As a result, the sealant of one of the two applying traces may overlap with the sealant of the other one of the two applying traces at the position of the adhesive cutting line, i.e. an overlapped region with two layers of the sealant is generated.

It is found that at least following defects exist in the above process: when the sealant is applied on the display substrate, a distribution of the overlapped region of the two adjacent sub display regions may be uneven due to a mechanical error and uncertainness of the spreading of the sealant, because the sealant, as a fluid, are of uncertainness upon being applied and spreading on the display substrate. In the case that the overlapped region is oversized, a smoothness of the bonded display substrates may be adversely affected, and a yield rate is reduced.

SUMMARY

An object of the present disclosure is to provide a display substrate, a display panel cutting method and a display device, so as to improve a smoothness of the bonded display substrates adversely affected by the overlapped region of the two pieces of the sealant on the two adjacent sub display regions being oversized, and thereby increasing the yield rate. The solutions of the present disclosure are as follows.

In one aspect, the present disclosure provides in some embodiments a display substrate, including at least two sub display regions and at least one blocking unit. The sub display regions are configured to form sub display substrates. Each of the at least one blocking unit includes two strip-like blocking patterns that are arranged at two sides of an adhesive cutting line on the display substrate respectively, and arranged in periphery regions of the two adjacent sub display regions respectively. Upon applying the sealant on the display substrate, applying traces for two adjacent sub display regions are arranged between the two strip-like blocking patterns.

Optionally, a distance between the first strip-like blocking pattern and the adhesive cutting line is equal to a distance between the second strip-like blocking pattern and the adhesive cutting line.

Optionally, the display substrate further includes two pieces of sealants applied thereon according to two applying traces corresponding to each blocking unit. A first piece of sealant covers the first strip-like blocking pattern, and the first piece of sealant includes sealant patterns formed at two sides of the first strip-like blocking pattern, a region of the sealant pattern of the first piece of sealant at a side close to the adhesive cutting line and a region between the first strip-like blocking pattern and the second strip-like blocking pattern are of a same shape, the first piece of sealant is either one of the two pieces of sealants, and the first strip-like blocking pattern and the applying trace of the first piece of sealant are arranged at a same side of the adhesive cutting line.

Optionally, the display substrate further includes two pieces of sealants applied thereon according to two applying traces corresponding to each blocking unit. A shape of any one of the two pieces of sealants is same as that of a region between the first strip-like blocking pattern and the second strip-like blocking pattern.

Optionally, each adhesive cutting line on the display substrate corresponds to a blocking unit.

Optionally, the at least one blocking unit is formed in a single patterning process.

Optionally, a thickness of any one of the strip-like blocking patterns is same as that of any one of the two pieces of sealants.

Optionally, any one of the strip-like blocking patterns is formed by photoresist.

Optionally, a distance between one of the two applying traces and the adhesive cutting line is equal to a distance between the other one of the two applying traces and the adhesive cutting line.

Optionally, each of the sub display regions further includes an active display region. In each of the sub display regions, a distance between the strip-like blocking pattern in the periphery region and the active display region is greater than a distance between the strip-like blocking pattern and the adhesive cutting line.

Optionally, the display substrate further includes two pieces of sealants applied thereon according to applying traces corresponding to each blocking unit, where the two pieces of sealants includes a first piece of sealant and a second piece of sealant. The first piece of sealant is arranged between the first strip-like blocking pattern and the second strip-like blocking pattern, and a projection of the first piece of sealant on the display substrate coincides with a projection of a region between the first strip-like blocking pattern and the second strip-like blocking pattern on the display substrate. The second piece of sealant is arranged between the first strip-like blocking pattern and the second strip-like blocking pattern, and a projection of the second piece of sealant on the display substrate coincides with a projection of a region between the first strip-like blocking pattern and the second strip-like blocking pattern on the display substrate.

Optionally, the first piece of sealant is further arranged on a surface of the first strip-like blocking pattern away from the display substrate, and the second piece of sealant is further arranged on a surface of the second strip-like blocking pattern away from the display substrate.

Optionally, a sum of thicknesses of the first and the second pieces of sealants in the region between the first strip-like blocking pattern and the second strip-like blocking pattern is equal to a sum of a thickness of the first strip-like blocking pattern and a thickness of the first piece of sealant arranged on the surface of the first strip-like blocking pattern away from the display substrate. A sum of thicknesses of the first and the second pieces of sealants in the region between the first strip-like blocking pattern and the second strip-like blocking pattern is equal to a sum of a thickness of the second strip-like blocking pattern and a thickness of the second piece of sealant arranged on the surface of the second strip-like blocking pattern away from the display substrate.

Optionally, the first piece of sealant is further arranged at a side of the first strip-like blocking pattern away from the adhesive cutting line, and the second piece of sealant is further arranged at a side of the second strip-like blocking pattern away from the adhesive cutting line.

In another aspect, the present disclosure provides in some embodiments a method for cutting a display panel, where the display panel includes a first display panel and a second display panel, the first display substrate includes at least two sub display regions and at least one blocking unit, the sub display regions are configured to form sub display substrates, each of the at least one blocking unit includes two strip-like blocking patterns that are arranged at two sides of an adhesive cutting line on the display substrate respectively, and arranged in periphery regions of two adjacent sub display regions respectively. The method includes: determining a position of the adhesive cutting line on the first display substrate; determining two applying traces on the first display substrate according to the position of the adhesive cutting line, where the two applying traces are parallel with the adhesive cutting line and arranged between the two strip-like blocking patterns; applying a sealant on the first display substrate according to the two applying traces; bonding the first display substrate and the second display substrate to form the display panel; and cutting the display panel along the adhesive cutting line.

Optionally, a distance between one of the two applying traces and the adhesive cutting line is equal to a distance between the other one of the two applying traces and the adhesive cutting line.

Optionally, a distance between one of the two strip-like blocking patterns and the adhesive cutting line is equal to a distance between the other one of the two strip-like blocking patterns and the adhesive cutting line.

In yet another aspect, the present disclosure provides in some embodiments a display device including the display panel according to the first aspect.

In the above technical solutions, the beneficial effect may be as follows.

According to the embodiments of the present disclosure, two strip-like blocking patterns are arranged at two sides of the adhesive cutting line to define a shape of the sealant. Therefore, the two strip-like blocking patterns may prevent the overlapped region in either of the sub display regions from being oversized, and thus improving smoothness of the bonded display substrates adversely affected by the overlapped region of the two pieces of the sealant on the two adjacent sub display regions being oversized, which may be caused by the mechanical error and the uncertainness of the applying the sealant on the display substrate. As a result, it prevents the overlapped region of the sub display regions from being oversized, and increases the yield rate.

It should be appreciated that, the above general description and the following detailed description are for illustration purposes only, and the present disclosure is not limited thereto.

BRIEF DESCRIPTION OF THE DRAWINGS

The drawings of the embodiments are incorporated herein as a portion of the description, and are used to construe principles of the present disclosure along with the description.

FIG. 2-1 is a schematic view showing a display substrate according to some embodiments of the present disclosure;

FIG. 2-2 is a schematic view showing a display substrate according to some embodiments of the present disclosure;

FIG. 2-3 is a schematic view showing a display substrate according to some embodiments of the present disclosure;

FIG. 3 is a flowchart showing a method for cutting a display panel according to some embodiments of the present disclosure;

REFERENCE SIGNS

11: sub display region; 12: blocking unit; 121, 122: strip-like blocking patterns; 111: periphery region; 13: adhesive cutting line; t: applying trace; k: distance between strip-like blocking pattern and adhesive cutting line; 112$a$, 112$b$: active display region; 141: first piece of sealant; 142: second piece of sealant; t1: applying trace of first piece of sealant; t2: applying trace of second piece of sealant.

The above drawings show the embodiments of the present disclosure, which will be explained in further details hereafter. These drawings and explanations are not intended to limit the scope of the present disclosure in any manner; instead, they are used for describe the principles of the present disclosure for a person skilled in the art in particular embodiments.

DETAILED DESCRIPTION

In the following, the embodiments of the present disclosure will be described in details in connection with the drawings. Unless otherwise defined, same or similar reference signs represent same or similar elements in respective drawings. The following embodiments do not include all of the embodiments in the scope of the present disclosure. Instead, the following embodiments are merely some exemplary devices or methods in the scope of the present disclosure defined in the attached claims.

Figure 1:
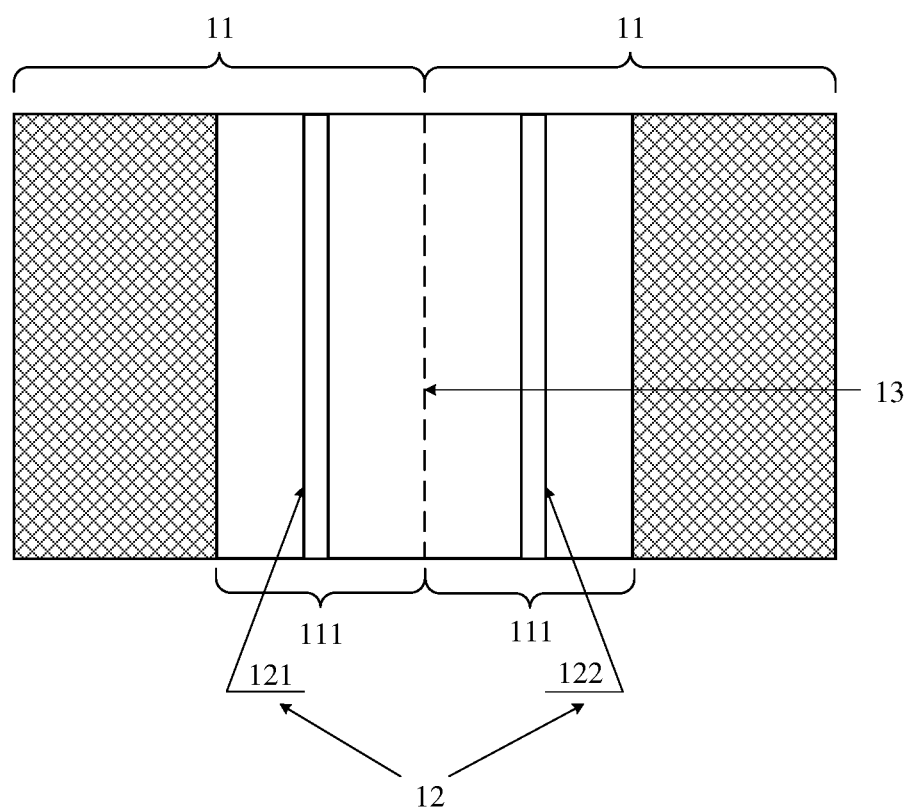
FIG. 1 is a schematic view showing a display substrate according to some embodiments of the present disclosure.

FIG. 1 is a schematic view showing a display substrate according to some embodiments of the present disclosure. The display substrate may include: at least two sub display regions 11 and at least one blocking unit 12, where the sub display regions 11 are used to form sub display substrates.

Each of the at least one blocking unit 12 includes two strip-like blocking patterns 121 and 122 that are arranged at two sides of an adhesive cutting line 13 on the display substrate respectively, and arranged in periphery regions 111 of the two adjacent sub display regions 11 respectively.

FIG. 1 shows a portion of the region of the display substrate. Other portions of the region of the display substrate are arranged in a similar manner.

As described above, in the display substrate according to the embodiments of the present disclosure, two strip-like blocking patterns are arranged at two sides of the adhesive cutting line to define a shape of the sealant. Therefore, the two strip-like blocking patterns may prevent the overlapped region in either of the two adjacent sub display regions from being oversized, and thus improving a smoothness of the bonded display substrates adversely affected by the overlapped region of the two pieces of the sealant on the two adjacent sub display regions being oversized, which may be caused by the mechanical error and the uncertainness of the applying the sealant on the display substrate. As a result, it prevents the overlapped region of the sub display regions from being oversized, and increases the yield rate.

Figures 1, 2:
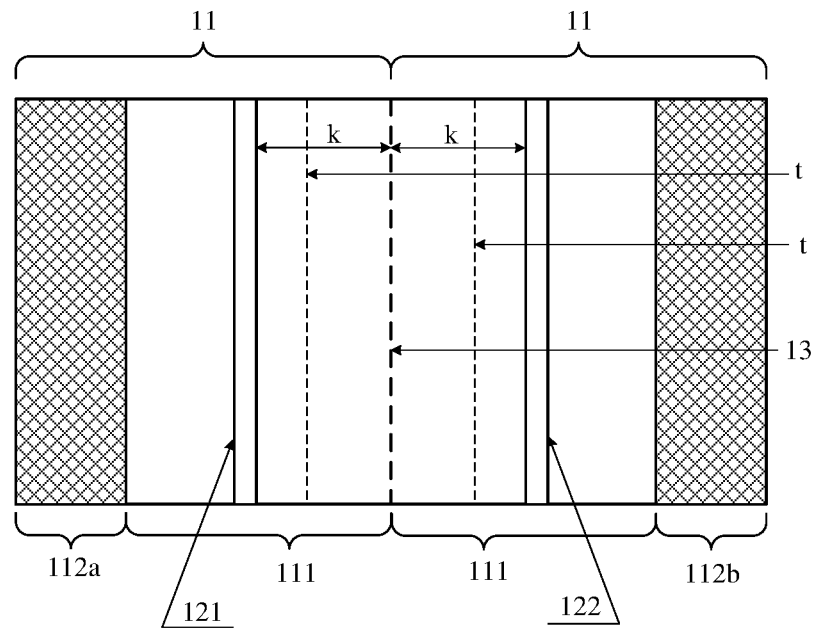
Figure 2:
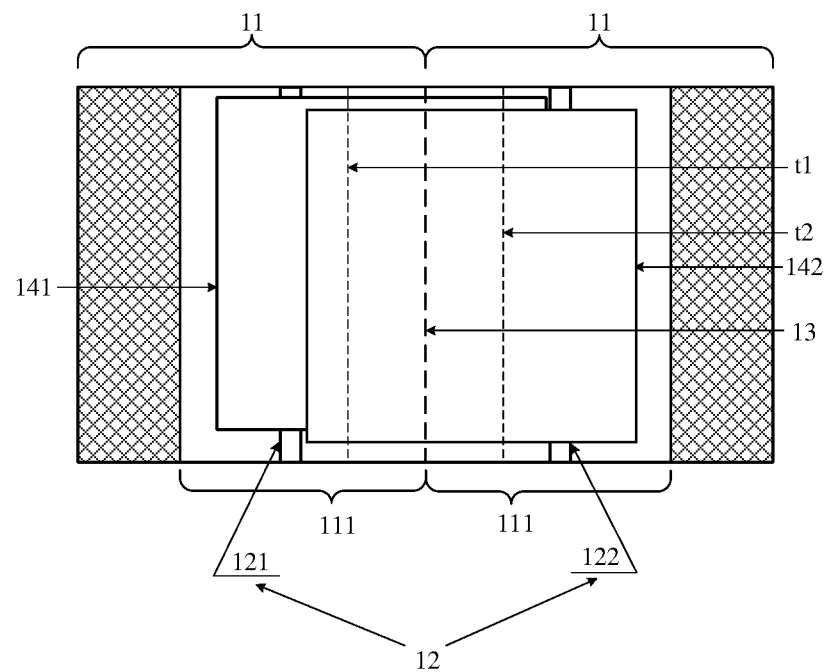

Further, referring to FIG. 2-1 showing another display substrate according to some embodiments of the present disclosure, this display substrate includes more preferred elements than the display substrate in FIG. 1, and thus has better performance.

Optionally, both a distance between the first strip-like blocking pattern 121 and the adhesive cutting line 12 and a distance between the second strip-like blocking pattern 122 and the adhesive cutting line 12 is of a value k. Thus, the overlapped regions of the pieces of sealant at two sides of the adhesive cutting line 13 are of an equal width k, and the equal overlapped regions at two sides of the adhesive cutting line 13 may further improve the smoothness of the display panel formed by bonding the two display substrates, and thereby improving a display quality of the display panel.

In addition, each sub display region 11 on the display substrate may include an active region and a periphery region 111. When the strip-like blocking pattern is arranged on the display panel, the strip-like blocking pattern may be arranged away from the active display region, so as to prevent the overlapped region of the pieces of sealant from adversely affecting the displaying of the active display region due to a short distance between the overlapped region and the active display region. For example, in FIG. 2-1, the strip-like blocking pattern 121 is arranged away from the active display region 112a in the sub display region corresponding to the strip-like blocking pattern 121, so as to prevent the strip-like blocking pattern 121 from being close to the active display region 112a, e.g., a distance between the strip-like blocking pattern 121 and the active display region 112a is arranged to be greater than a distance between the strip-like blocking pattern 121 and the adhesive cutting line 13. Similarly, the strip-like blocking pattern 122 may be arranged away from the active display region 112b in the sub display region corresponding to the strip-like blocking pattern 122.

Optionally, a distance between one of the two applying traces t and the adhesive cutting line 13 is equal to a distance between the other one of the two applying traces t and the adhesive cutting line 13. The equal distances of the two applying traces t to the adhesive cutting line 13 enable the sealant to form similar patterns on the display substrate. The applying traces t represent projections of moving traces of sealant nozzles on the display panel upon the sealant nozzles applying the sealant.

FIG. 2-2 shows another display substrate according to some embodiments of the present disclosure, where the display substrate further includes two pieces of sealant applied thereon according to the applying traces corresponding to each blocking unit. Each blocking unit corresponds to the applying traces between two strip-like blocking patterns of the blocking unit.

A first piece of sealant 141 covers the first strip-like blocking pattern 121, and sealant patterns of the first piece of sealant are formed at two sides of the first strip-like blocking pattern 121, a region of the sealant pattern of the first piece of sealant 141 at the side close to the adhesive cutting line 13 and the region between the two strip-like blocking patterns are of a same shape, i.e., the first piece of sealant 141 may cover all the region between the two strip-like blocking patterns 121 and 122, the first piece of sealant 141 is either one of the two pieces of sealant, and the first strip-like blocking pattern 121 and the applying trace t1 of the first piece of sealant 141 are arranged at a same side of the adhesive cutting line 13.

The second piece of sealant 142 is the other one of the two pieces of sealant apart from the first piece of sealant 141. The second piece of sealant 142 has an applying trace t2 and is formed in a similar manner as the first piece of sealant 141. In addition, the region of the first piece of sealant 141 between the two strip-like blocking patterns 121 and 122 and the region of the second piece of sealant 142 between the two strip-like blocking patterns 121 and 122 may be of a same shape (In FIG. 2-2, these two regions are of different shapes to facilitate distinguishing the first piece of sealant and the second piece of sealant).

In the display panel in FIG. 2-2, the strip-like blocking pattern and the applying trace of the sealant at a same side of the adhesive cutting line are relatively close to each other. In this case, a small portion of the sealant, upon being applied, may spread to a side of the strip-like blocking pattern away from the adhesive cutting line.

It should be noted that, the first piece of sealant 141 may not spread to a side of the strip-like blocking pattern 122 away from the adhesive cutting line because the applying trace corresponding to the first piece of sealant 141 is far away from the strip-like blocking pattern 122 located at the other side of the adhesive cutting line 13. The second piece of sealant 142 is arranged in a similar manner, which is not repeated herein.

Figures 2, 3:
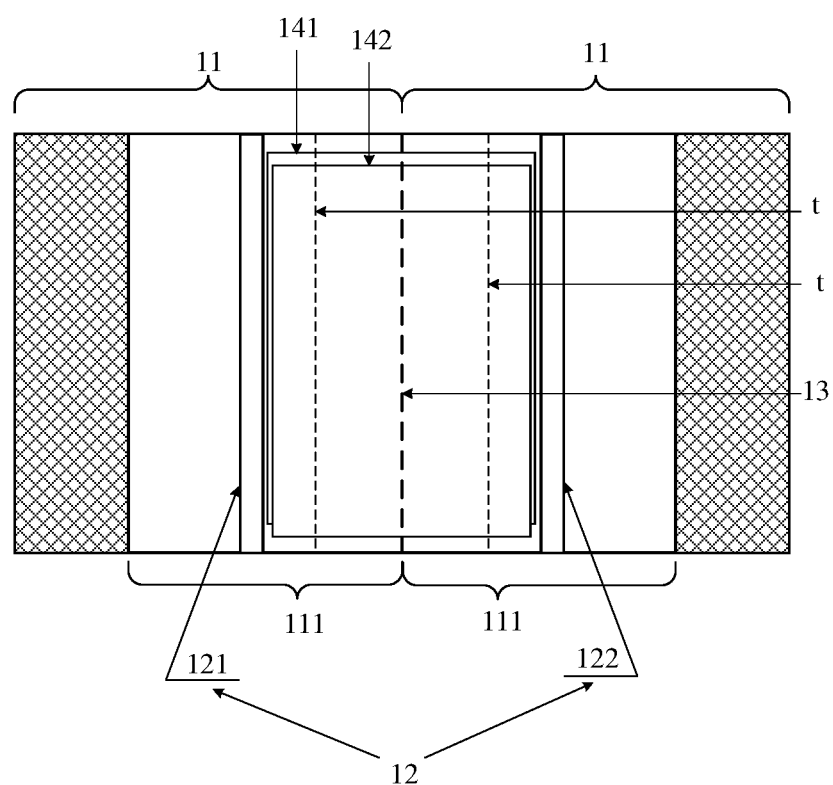
Figure 3:
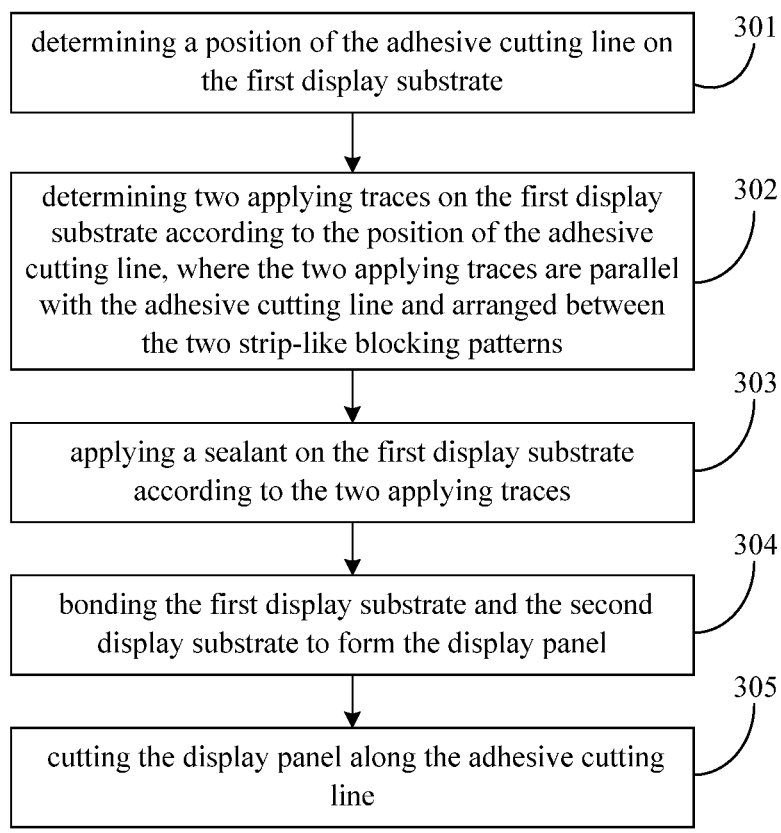

FIG. 2-3 shows yet another display substrate according to some embodiments of the present disclosure, where the display substrate further includes two pieces of sealant applied thereon according to the applying traces corresponding to each blocking unit. Each blocking unit corresponds to the applying traces between two strip-like blocking patterns of the blocking unit.

A shape of any one of the two pieces of sealant 141 and 142 is same as that of a region between the strip-like blocking patterns 121 and 122 in the blocking unit 12 (In FIG. 2-3, these two regions are of different shapes to facilitate distinguishing the two pieces of sealant).

In the display panel in FIG. 2-3, the applying trace t of the sealant and the strip-like blocking pattern at a same side of the adhesive cutting line 13 are far away from each other. In this case, the sealant, upon being applied, may not spread to a side of the strip-like blocking pattern away from the adhesive cutting line. In other words, both the sealant pattern of the first piece of sealant 141 and the sealant pattern of the second piece of sealant 142 are arranged between the strip-like blocking patterns 121 and 122.

It should be noted that, in the display substrate as shown in FIG. 2-3, the first piece of sealant 141 may spread onto the strip-like blocking pattern 121 upon being applied, but may not cross the strip-like blocking pattern 121 and reach the of the strip-like blocking pattern 121 away from the adhesive cutting line. The second piece of sealant 142 is arranged in a similar manner, which is not repeated herein.

Optionally, each adhesive cutting line on the display substrate corresponds to a blocking unit. In other words, it is arranged a corresponding blocking unit on each of the adhesive cutting lines on the first display substrate, and each of the adhesive cutting lines corresponds to the blocking unit including strip-like blocking patterns arranged at two sides of the adhesive cutting line.

Further, the adhesive cutting line 13 may indicate a cutting position for the two adjacent sub display regions 11. No GOA circuit is arranged for each of the two adjacent sub display regions 11 at a position close to the adhesive cutting line. Optionally, the adhesive cutting line 13 may be arranged along a relatively long side of the sub display region 11.

Optionally, in some embodiments of the present disclosure, at least one blocking unit is formed by photoresist in a single patterning process.

Figure 5:
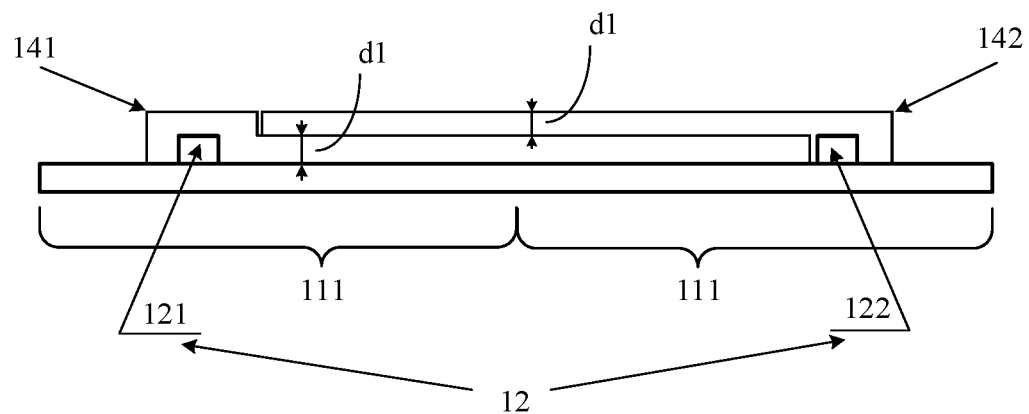
FIG. 5 is a schematic view showing thicknesses of pieces of sealant according to some embodiments of the present disclosure.
Figure 6:
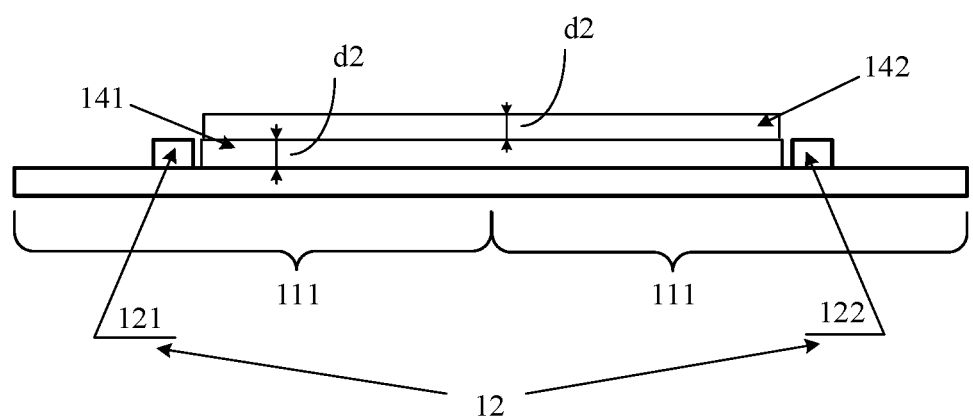
FIG. 6 is a schematic view showing thicknesses of pieces of sealant according to some other embodiments of the present disclosure.

Optionally, a thickness of any one of the strip-like blocking patterns is same as that of any one of the two pieces of sealant. For example, in the display panel of FIG. 2-2, the thicknesses of respective regions may have the following relations:

a thickness of the overlapped region formed by the two pieces of the sealant equals to a sum of a thickness of the strip-like blocking pattern 121 and a thickness of the first piece of sealant 141 formed on the strip-like blocking pattern 121, and equals to a sum of a thickness of the strip-like blocking pattern 122 and a thickness of the second piece of sealant 142 formed on the strip-like blocking pattern 122. In other words, the whole region between the two strip-like blocking patterns on the display substrate has an even thickness. As a result, it enables to further improve the smoothness of the display panel formed by the display substrates, and improve the display quality of the display panel. FIG. 5 is a schematic view showing thicknesses of the two pieces of the sealant and the strip-like blocking patterns according to some embodiments of the present disclosure, the strip-like blocking pattern 121, the first piece of sealant 141, the strip-like blocking pattern 122, and the second piece of sealant 142 each have a thickness of d1. In some other embodiments of the present disclosure, as shown in FIG. 6, the strip-like blocking pattern 121, the first piece of sealant 141, the strip-like blocking pattern 122, and the second piece of sealant 142 each have a thickness of d2.

It should be noted that, in each embodiment of the present disclosure, the display substrate may be an array substrate or a color filter substrate.

It should be noted that, in the display substrate according to the embodiments of the present disclosure, a distance between any one of the strip-like blocking patterns and the adhesive cutting line is of an equal value, such that the overlapped regions of the sealant at two sides of the adhesive cutting line are of an equal width. As a result, it enables to improve the smoothness of the display panel formed by bonding the two display substrates, and improve the display quality of the display panel.

It should be noted that, in the display substrate according to the embodiments of the present disclosure, a thickness of any one of the strip-like blocking patterns is equal to a thickness of any one of the two pieces of sealant, such that the whole region between the two strip-like blocking patterns on the display substrate has an even thickness. As a result, it enables to further improve the smoothness of the display panel formed by bonding the display substrates, and improve the display quality of the display panel.

As described above, in the display substrate according to the embodiments of the present disclosure, two strip-like blocking patterns are arranged at two sides of the adhesive cutting line to define a shape of the sealant. Therefore, the two strip-like blocking patterns may prevent the overlapped region in either of the sub display regions from being oversized, and thus improving a smoothness of the bonded display substrates adversely affected by the overlapped region of the two pieces of the sealant on the two adjacent sub display regions being oversized, which may be caused by the mechanical error and the uncertainness of the applying the sealant on the display substrate. As a result, it prevents the overlapped region of the sub display regions from being oversized, and increases the yield rate.

FIG. 3 is a flow chart showing a display panel cutting method, where a display panel includes a first display substrate and a second display substrate. The first display substrate includes at least two sub display regions and at least one blocking unit, the sub display regions are used to form sub display substrates, and each of the at least one blocking unit includes two strip-like blocking patterns that are arranged at two sides of an adhesive cutting line on the display substrate respectively, and are arranged in periphery regions of the two adjacent sub display regions respectively.

The display panel cutting method includes:

step 301: determining a position of the adhesive cutting line on the first display substrate;

step 302: determining two applying traces on the first display substrate according to the position of the adhesive cutting line, where the two applying trace are parallel with the adhesive cutting line and arranged between the two strip-like blocking patterns;

step 303: applying a sealant on the first display substrate according to the two applying traces;

step 304: bonding the first display substrate and the second display substrate to form the display panel; and step 305: cutting the display panel along the adhesive cutting line.

As described above, in the display panel cutting method according to the embodiments of the present disclosure, two strip-like blocking patterns are arranged at two sides of the adhesive cutting line to define a shape of the sealant. Therefore, the two strip-like blocking patterns may prevent the overlapped region in either of the sub display regions from being oversized, and thus improving a smoothness of the bonded display substrates adversely affected by the overlapped region of the two pieces of the sealant on the two adjacent sub display regions being oversized, which may be caused by the mechanical error and the uncertainness of the applying the sealant on the display substrate. As a result, it prevents the overlapped region of the sub display regions from being oversized, and increases the yield rate.

Figure 4:
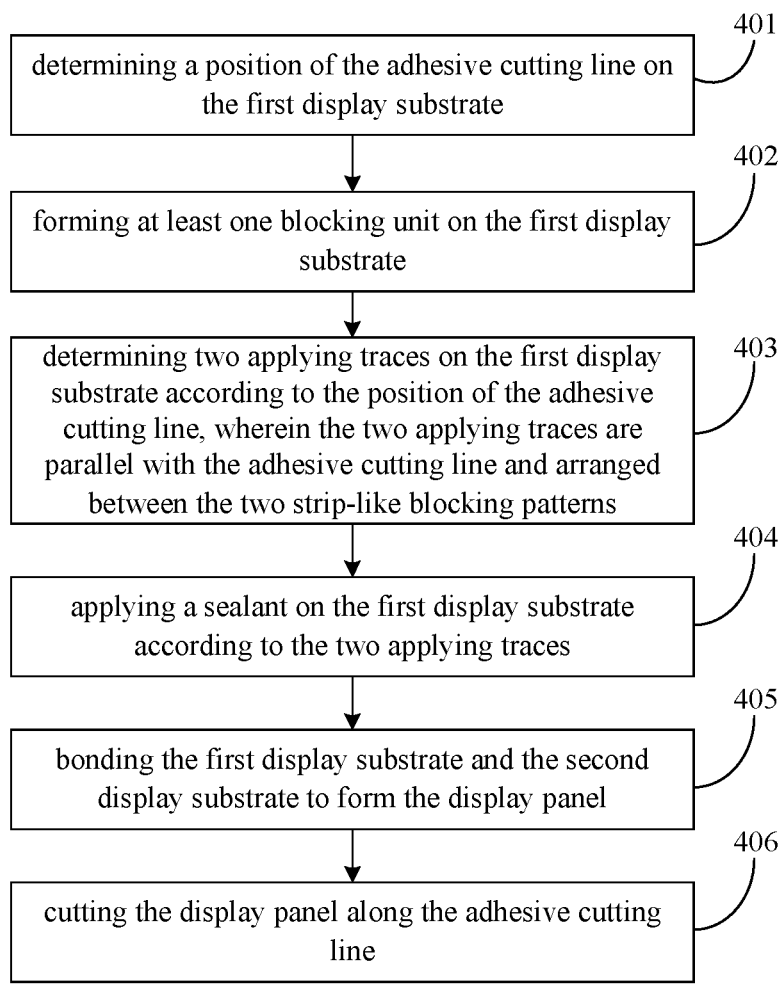
FIG. 4 is a flowchart showing a method for cutting a display panel according to some embodiments of the present disclosure.

FIG. 4 is a flowchart showing another display panel cutting method according to some embodiments of the present disclosure. A display panel includes a first display substrate and a second display substrate. The first display substrate includes at least two sub display regions for forming sub-display substrates. The method includes the following steps.

Step 401: determining a position of an adhesive cutting line on the first display substrate.

In some embodiments of the present disclosure, the position of the adhesive cutting line on the first display substrate may be determined through datum points of the cutting line. The datum points of the cutting line are arranged on the first display substrate in advance and configured to determine the adhesive cutting line. The first display substrate may be any substrate in the display panel, e.g., the array substrate or the color filter substrate.

Further, the adhesive cutting line may indicate a cutting position for the two adjacent sub display regions. No GOA circuit for each of the two adjacent sub display regions is arranged at a position close to the adhesive cutting line.

Step 402: forming at least one blocking unit on the first display substrate.

After determining the adhesive cutting line, the at least one blocking unit may be formed on the first display substrate according to the position of the adhesive cutting line. Each of the at least one blocking unit includes two strip-like blocking patterns that are arranged at two sides of the adhesive cutting line on the display substrate respectively, and are arranged in periphery regions of the two adjacent sub display regions respectively.

In addition, a distance between one of the two strip-like blocking patterns and the adhesive cutting line is equal to a distance between the other one of the two strip-like blocking patterns and the adhesive cutting line. Thus, the overlapped regions of the pieces of sealant at two sides of the adhesive cutting line are of an equal width (i.e. the widths of the overlapped regions in a direction perpendicular to the adhesive cutting line are equal), and the equal overlapped regions at two sides of the adhesive cutting line may further improve the smoothness of the display panel formed by bonding the first and the second display substrates, and thereby improving a display quality of the display panel.

Optionally, each adhesive cutting line on the first display substrate corresponds to a blocking unit. In other words, it is arranged a corresponding blocking unit for each of the adhesive cutting lines on the first display substrate, and each of the adhesive cutting lines corresponds to the blocking unit including the strip-like blocking patterns arranged at two sides of the adhesive cutting line.

FIG. 2-1 shows the structure of the first display substrate after the step 402 is performed.

Step 403: determining two applying traces on the first display substrate according to the position of the adhesive cutting line, where the two applying trace are parallel with the adhesive cutting line and arranged between the two strip-like blocking patterns.

After the blocking unit is formed on the first display substrate, it may determine two applying traces on the first display substrate according to the position of the adhesive cutting line, where the two applying trace are parallel with the adhesive cutting line and arranged between the two strip-like blocking patterns.

Optionally, a distance between one of the two applying traces and the adhesive cutting line is equal to a distance between the other one of the two applying traces and the adhesive cutting line. The equal distances of the two applying traces to the adhesive cutting line enable the sealant to form similar patterns on the first display substrate.

Step 404: applying a sealant on the first display substrate according to the two applying traces.

After determining the two applying traces, the sealant may be applied on the first display substrate according to the two applying traces.

It should be noted that, during the process of applying the sealant on the first display substrate according to the two applying traces, it may firstly apply the sealant on the first display substrate according to one of the two applying traces, and then apply the sealant on the first display substrate according to the other one of the two applying traces. It may refer to the related art for details of the above process, which is not explicitly elaborated herein.

Each of FIGS. 2-2 and 2-3 shows a structure of the first display substrate after the step 404 is performed.

Step 405: bonding the first display substrate and the second display substrate to form the display panel.

After the two pieces of sealant are applied on the first substrate, it may bond the first substrate and the second substrate to form the display panel. It should be noted that, in the process of boning the first display substrate and the second display substrate, a liquid crystal layer may be arranged between the first display substrate and the second display substrate. It may refer to the related art for details of the bonding process, which is not explicitly elaborated herein.

The strip-like blocking patterns define the sizes of the pieces of sealant at two sides of the adhesive cutting line on the first display substrate and prevent them from being oversized. As a result, it enable to improve the smoothness of the display panel formed by bonding the first display substrate and the second display substrate, and thus improve the display quality of the display panel.

Step 406: cutting the display panel along the adhesive cutting line.

After the first display substrate and the second display substrate are bonded to form the display panel, the display panel may be cut along the adhesive cutting lines into multiple sub display panels. Then, the sub display panels may be subjected to subsequent manufacturing processes. The smoothness of the display panel is improved, and thus the smoothness of the sub display panels formed by cutting the display panel along the adhesive cutting lines is improved accordingly.

It should be noted that, in the display panel cutting method according to the embodiments of the present disclosure, when the strip-like blocking patterns are formed, a distance between any one of the strip-like blocking patterns and the adhesive cutting line is of an equal value, such that the overlapped regions of the sealant at two sides of the adhesive cutting line are of an equal width. As a result, it enables to improve the smoothness of the display panel formed by bonding the first and the second display substrates, and improve the display quality of the display panel.

It should be noted that, in the display panel cutting method according to the embodiments of the present disclosure, when the strip-like blocking patterns are formed, a thickness of any one of the strip-like blocking patterns is equal to a thickness of any one of the two pieces of sealant, such that the whole region between the two strip-like blocking patterns on the display substrate has an even thickness. As a result, it enables to further improve the smoothness of the display panel formed by the display substrates, and improve the display quality of the display panel.

As described above, in the display panel cutting method according to the embodiments of the present disclosure, two strip-like blocking patterns are formed on the display panel to define a shape of the sealant. Therefore, the two strip-like blocking patterns may prevent the overlapped region in either of the sub display regions from being oversized, and thus improving the smoothness of both the display panel and the sub display panels adversely affected by the overlapped region of the two pieces of the sealant on the two adjacent sub display regions being oversized, which may be caused by the mechanical error and the uncertainness of the applying the sealant on the display substrate, and the sub display panels are formed by cutting the display panel. As a result, the display panel and the sub display panels have good smoothness, and the yield rate is increased.

In addition, the present disclosure further provides in some embodiments a display device including the display substrate as shown in FIG. 1, the display substrate as shown in FIG. 2-1, the display substrate as shown in FIG. 2-2, or the display substrate as shown in FIG. 2-3.

The above are merely the preferred embodiments of the present disclosure and shall not be used to limit the scope of the present disclosure. Any further improvements, substitutes and modifications made without departing from the spirit and principle of the present disclosure shall also fall within the scope of the present disclosure.

What is claimed is:

1. A display substrate, comprising at least two sub display regions and at least one sealant blocking unit, wherein the sub display regions are configured to form sub display substrates,
    each of the at least one sealant blocking unit comprises a first strip-like blocking pattern and a second strip-like blocking pattern that are arranged at two sides of a cutting line on the display substrate respectively and are arranged in periphery regions of two adjacent sub display regions respectively;
    the display substrate further comprises two pieces of sealants applied thereon according to two applying traces corresponding to each sealant blocking unit, a region, in which projections of the two pieces of sealants onto the display substrate overlap, is between the first strip-like blocking pattern and the second strip-like blocking pattern;
    in a sub display region of the at least two sub display regions, a first piece of sealant covers the first strip-like blocking pattern, and the first piece of sealant comprises sealant patterns that are formed between an active display region of the sub display region and the first strip-like blocking pattern, and between the first strip-like blocking pattern and the cutting line; and
    the first piece of sealant is either one of the two pieces of sealants, and the first strip-like blocking pattern and the applying trace of the first piece of sealant are arranged at a same side of the cutting line.

2. The display substrate according to claim 1, wherein a distance between the first strip-like blocking pattern and the cutting line is equal to a distance between the second strip-like blocking pattern and the cutting line.

3. The display substrate according to claim 2, wherein
    each of the sub display regions comprises an active display region; and
    in each of the sub display regions, a distance between the strip-like blocking pattern in the periphery region and the active display region is greater than a distance between the strip-like blocking pattern and the cutting line.

4. The display substrate according to claim 1, wherein a region of the sealant pattern of the first piece of sealant at a side close to the cutting line and a region between the first strip-like blocking pattern and the second strip-like blocking pattern are of a same shape.

5. The display substrate according to claim 1, wherein each cutting line on the display substrate is between a first strip-like blocking pattern and a second strip-like blocking pattern of a sealant blocking unit.

6. The display substrate according to claim 1, wherein the at least one sealant blocking unit is formed in a single patterning process.

7. The display substrate according to claim 1, wherein a thickness of any one of the first strip-like blocking pattern and the second strip-like blocking pattern is same as that of any one of the two pieces of sealants.

8. The display substrate according to claim 1, wherein any one of the first strip-like blocking pattern and the second strip-like blocking pattern is formed by photoresist.

9. The display substrate according to claim 1, wherein a distance between one of the two applying traces and the cutting line is equal to a distance between the other one of the two applying traces and the cutting line.

10. The display substrate according to claim 1, wherein the other one of the two pieces of sealants is a second piece of sealant;
    the first piece of sealant comprises a first portion arranged between the first strip-like blocking pattern and the second strip-like blocking pattern, and a projection of the first portion of the first piece of sealant onto the display substrate coincides with a projection of a region between the first strip-like blocking pattern and the second strip-like blocking pattern onto the display substrate; and
    the second piece of sealant comprises a second portion arranged between the first strip-like blocking pattern and the second strip-like blocking pattern, and a projection of the second portion of the second piece of sealant onto the display substrate coincides with a projection of a region between the first strip-like blocking pattern and the second strip-like blocking pattern onto the display substrate.

11. The display substrate according to claim 10, wherein the first piece of sealant comprises a third portion arranged on a surface of the first strip-like blocking pattern away from the display substrate, and the second piece of sealant comprises a fourth portion arranged on a surface of the second strip-like blocking pattern away from the display substrate.

12. The display substrate according to claim 11, wherein a sum of thicknesses of the first portion and the second portion in the region between the first strip-like blocking pattern and the second strip-like blocking pattern is equal to a sum of a thickness of the first strip-like blocking pattern and a thickness of the third portion arranged on the surface of the first strip-like blocking pattern away from the display substrate; and
    the sum of thicknesses of the first portion and the second portion in the region between the first strip-like blocking pattern and the second strip-like blocking pattern is equal to a sum of a thickness of the second strip-like blocking pattern and a thickness of the fourth portion arranged on the surface of the second strip-like blocking pattern away from the display substrate.

13. The display substrate according to claim 11, wherein the first piece of sealant comprises a fifth portion arranged at a side of the first strip-like blocking pattern away from the cutting line, and the second piece of sealant comprises a sixth portion arranged at a side of the second strip-like blocking pattern away from the cutting line.

14. The display substrate according to claim 1, wherein the projections of the two pieces of sealants onto the display substrate both overlap the cutting line.

15. A method for cutting a display panel, wherein the display panel comprises a first display panel and a second display panel, the first display substrate comprises at least two sub display regions and at least one sealant blocking unit, the sub display regions are configured to form sub display substrates, each of the at least one sealant blocking unit comprises two strip-like blocking patterns that are arranged at two sides of a cutting line on the display substrate respectively, and arranged in periphery regions of two adjacent sub display regions respectively;

the display substrate further comprises two pieces of sealants applied thereon according to two applying traces corresponding to each sealant blocking unit, a region, in which projections of the two pieces of sealants onto the display substrate overlap, is between the first strip-like blocking pattern and the second strip-like blocking pattern;

in a sub display region of the at least two sub display regions, a first piece of sealant covers the first strip-like blocking pattern, and the first piece of sealant comprises sealant patterns that are formed between an active display region of the sub display region and the first strip-like blocking pattern, and between the first strip-like blocking pattern and the cutting line;

the first piece of sealant is either one of the two pieces of sealants, and the first strip-like blocking pattern and the applying trace of the first piece of sealant are arranged at a same side of the cutting line;

the method comprises:

determining a position of the cutting line on the first display substrate;

determining two applying traces on the first display substrate according to the position of the cutting line, wherein the two applying traces are parallel with the cutting line and arranged between the two strip-like blocking patterns;

applying a sealant on the first display substrate according to the two applying traces;

bonding the first display substrate and the second display substrate to form the display panel; and cutting the display panel along the cutting line.

16. The method according to claim 15, wherein a distance between one of the two applying traces and the cutting line is equal to a distance between the other one of the two applying traces and the cutting line.

17. The method according to claim 15, wherein a distance between one of the two strip-like blocking patterns and the cutting line is equal to a distance between the other one of the two strip-like blocking patterns and the cutting line.

18. A display device comprising a display substrate, wherein the display substrate comprises at least one sealant blocking unit, wherein the sub display regions are configured to form sub display substrates, and each of the at least one sealant blocking unit comprises a first stripe-like blocking pattern and a second strip-like blocking pattern, that are arranged at two sides of a cutting line on the display substrate respectively and are arranged in periphery regions of two adjacent sub display regions respectively;

the display substrate further comprises two pieces of sealants applied thereon according to two applying traces corresponding to each sealant blocking unit, a region, in which projections of the two pieces of sealants onto the display substrate overlap, is between the first strip-like blocking pattern and the second strip-like blocking pattern;

in a sub display region of the at least two sub display regions, a first piece of sealant covers the first strip-like blocking pattern, and the first piece of sealant comprises sealant patterns that are formed between an active display region of the sub display region and the first strip-like blocking pattern, and between the first strip-like blocking pattern and the cutting line; and the first piece of sealant is either one of the two pieces of sealants, and the first strip-like blocking pattern and the applying trace of the first piece of sealant are arranged at a same side of the cutting line.

* * * * *